US007916008B2

(12) United States Patent
Nathan et al.

(10) Patent No.: US 7,916,008 B2
(45) Date of Patent: Mar. 29, 2011

(54) RFID SYSTEMS FOR VEHICULAR APPLICATIONS

(75) Inventors: John F. Nathan, White Lake, MI (US); H. Winston Maue, Northville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/306,068

(22) Filed: Dec. 15, 2005

(65) Prior Publication Data
US 2007/0139185 A1   Jun. 21, 2007

(51) Int. Cl.
*B60Q 1/00* (2006.01)
(52) U.S. Cl. ............... 340/438; 340/457.1; 340/572.1
(58) Field of Classification Search .......... 340/572.1, 340/438, 457.1
See application file for complete search history.

(56) References Cited

U.S. PATENT DOCUMENTS

| 5,461,385 | A | * | 10/1995 | Armstrong | 342/42 |
|---|---|---|---|---|---|
| 5,883,582 | A | * | 3/1999 | Bowers et al. | 340/10.2 |
| 6,024,382 | A | * | 2/2000 | Baumann | 280/801.1 |
| 6,025,783 | A | * | 2/2000 | Steffens, Jr. | 340/644 |
| 6,362,734 | B1 | | 3/2002 | McQuade et al. | |
| 6,489,889 | B1 | * | 12/2002 | Smith | 340/457 |
| 6,683,534 | B2 | * | 1/2004 | Patterson et al. | 340/436 |
| 6,684,972 | B2 | * | 2/2004 | Oyaski | 180/268 |
| 6,809,640 | B1 | * | 10/2004 | Sherman | 340/457.1 |
| 7,158,032 | B2 | * | 1/2007 | Rodriguez et al. | 340/572.1 |
| 7,180,409 | B2 | * | 2/2007 | Brey | 340/442 |
| 7,209,033 | B2 | * | 4/2007 | Hofbeck et al. | 340/457.1 |
| 2002/0140215 | A1 | | 10/2002 | Breed | |
| 2003/0060957 | A1 | * | 3/2003 | Okamura et al. | 701/45 |
| 2003/0160689 | A1 | * | 8/2003 | Yazdgerdi | 340/457.1 |
| 2003/0222767 | A1 | | 12/2003 | Patterson | |
| 2004/0119599 | A1 | * | 6/2004 | Stevenson et al. | 340/686.1 |
| 2005/0046584 | A1 | * | 3/2005 | Breed | 340/825.72 |
| 2005/0192727 | A1 | | 9/2005 | Shostak et al. | |
| 2005/0273218 | A1 | | 12/2005 | Breed | |
| 2006/0022801 | A1 | * | 2/2006 | Husak et al. | 340/10.5 |
| 2006/0108167 | A1 | * | 5/2006 | Finger | 180/268 |

FOREIGN PATENT DOCUMENTS

| JP | 2001018748 A | 1/2001 |
|---|---|---|
| WO | WO 98/29283 A1 | 7/1998 |
| WO | WO 98/32190 A2 | 7/1998 |
| WO | WO 2005/069203 A2 | 7/2005 |

* cited by examiner

*Primary Examiner* — George A Bugg
*Assistant Examiner* — Kerri McNally
(74) *Attorney, Agent, or Firm* — MacMillan, Sobanski and Todd, LLC

(57) ABSTRACT

An indication system (10) for a vehicle (11) includes a radio frequency circuit (12) with a transponder (84) and an in-vehicle RF tagged element (18). The transponder (84) transmits a status request signal. A first radio frequency identification tag (84) is coupled to the in-vehicle RF tagged element (18). The tag (84) inductively generates a current status signal associated with the in-vehicle element (18) and in response to the status request signal. A method of tracking, identifying, and determining the presence and status of an in-vehicle RF tagged element (18) includes transmitting a status request signal. The status request signal is inductively received via multiple radio frequency identification tags (84, 86) that are associated with the in-vehicle RF tagged element (18). A current status signal is transmitted from the radio frequency identification tags (84, 86). An in-vehicle task is performed in response to the current status signal.

6 Claims, 3 Drawing Sheets

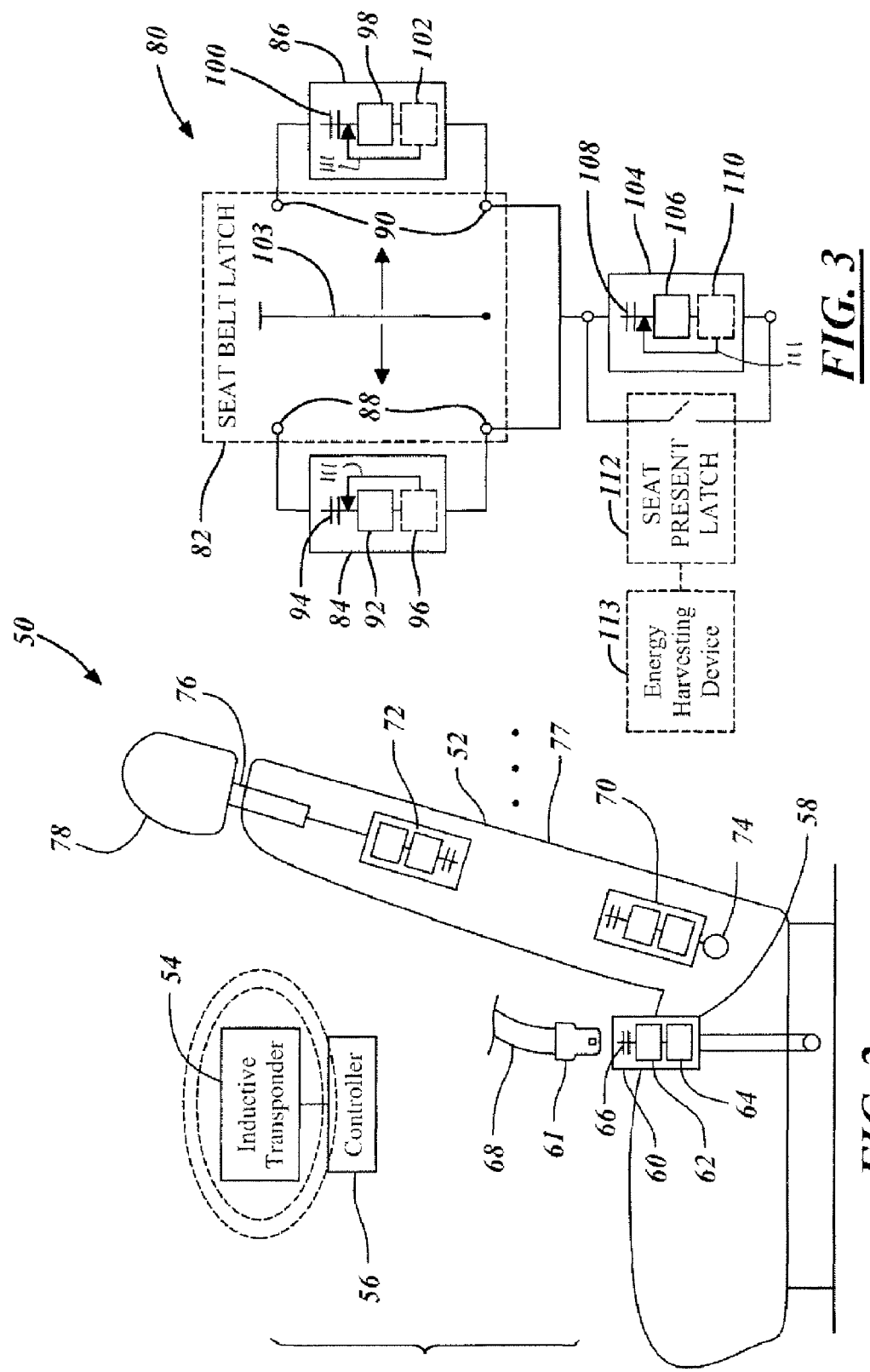

RFID SYSTEMS FOR VEHICULAR APPLICATIONS

TECHNICAL FIELD

The present invention relates to in-vehicle status and tracking systems. More particularly, the present invention is related to systems and methods for tracking and determining the presence and status of vehicle components, devices, and fluids within a vehicle.

BACKGROUND OF THE INVENTION

Modern automotive vehicles include numerous systems, components, devices, and fluids. There are several electronic systems available and utilized for determining the presence and/or current status thereof. Status indicators are coupled to the electronic systems and are used to inform a vehicle operator of information pertaining thereto. The information may include vehicle and occupant safety related information, maintenance related information, system status related information, etc. For example, a driver of a vehicle may be informed when a door is ajar, when a seat belt is not latched, or when the oil level or pressure in the vehicle is low. Status indicators are also used by onboard monitoring systems to perform various tasks. For example, a vehicle controller may deploy or inhibit deployment of an airbag in the event of a collision in response to the presence of an occupant in a corresponding location or seat.

With the ever-increasing number of indicators and related systems and devices comes an increasing amount of wiring and system complexity. Each indicator or indicator system typically includes one or more sensors, connections to a power supply and ground, and associated wiring. The increase in the amount of wires within a vehicle increases the associated overall weight and costs of that vehicle.

It is desirous to reduce the number of vehicle components, vehicle weight, and vehicle complexity for increased ease and reduced costs and time associated with the manufacturing and assembly of a vehicle. Such a reduction may also reduce maintenance and/or repair costs associated with a vehicle. Thus, there exists a need for improved techniques of providing the stated indication information.

SUMMARY OF THE INVENTION

In one embodiment of the present invention, an indication system for a vehicle is provided that includes a radio frequency circuit with a transponder and an in-vehicle RF tagged element. The transponder transmits a status request signal. A first radio frequency identification tag is coupled to the in-vehicle RF tagged element. The tag inductively generates a current status signal associated with the in-vehicle RF tagged element and in response to the status request signal.

Another embodiment of the present invention provides a method of tracking, identifying, and determining the presence and status of an in-vehicle RF tagged element. The method includes transmitting a status request signal. The status request signal is inductively received via multiple radio frequency identification tags that are associated with the in-vehicle RF tagged element. A current status signal is transmitted from the radio frequency identification tags. An in-vehicle task is performed in response to the current status signal.

The embodiments of the present invention provide several advantages. One such advantage is the ability to determine the status of an in-vehicle system, device, or component, such as a seat system through the use of passive transponders. This eliminates the need for power and ground wiring to and from sensors and other in-vehicle elements.

Another advantage provided by an embodiment of the present invention and as associated with seat systems is the ability to wirelessly and passively determine the status of seat systems, seat belts, and the presence of occupants therein.

Yet another embodiment of the present invention, allows for the transmission and reception of various status signals on one or more frequencies. The transmission and reception on a single frequency minimizes bandwidth requirements and reduces the frequency accuracy requirements and thus the costs and complexity of a receiver.

Still another embodiment of the present invention provides for the use of one or more backup radio-frequency identification transponders. This ensures proper status notification, provides increased safety, and provides error notification when appropriate.

The above-stated advantages provide an efficient, simple, lightweight, and inexpensive technique for tracking, identifying, and determining the presence and status of vehicle elements.

The present invention itself, together with further objects and attendant advantages, will be best understood by reference to the following detailed description, when taken in conjunction with the accompanying drawing(s).

BRIEF DESCRIPTION OF THE DRAWINGS

For a more complete understanding of this invention, reference should be made to the embodiments illustrated in greater detail in the accompanying drawing figures, and also described below by way of examples of the invention, wherein:

FIG. 2 is a side block diagrammatic view of a radio frequency identification system as applied to a seat system and in accordance with an embodiment of the present invention.

FIG. 3 is a schematic representative example view of single-pole-single-throw radio frequency identification circuit in accordance with an embodiment of the present invention.

DETAILED DESCRIPTION

Figure 1:
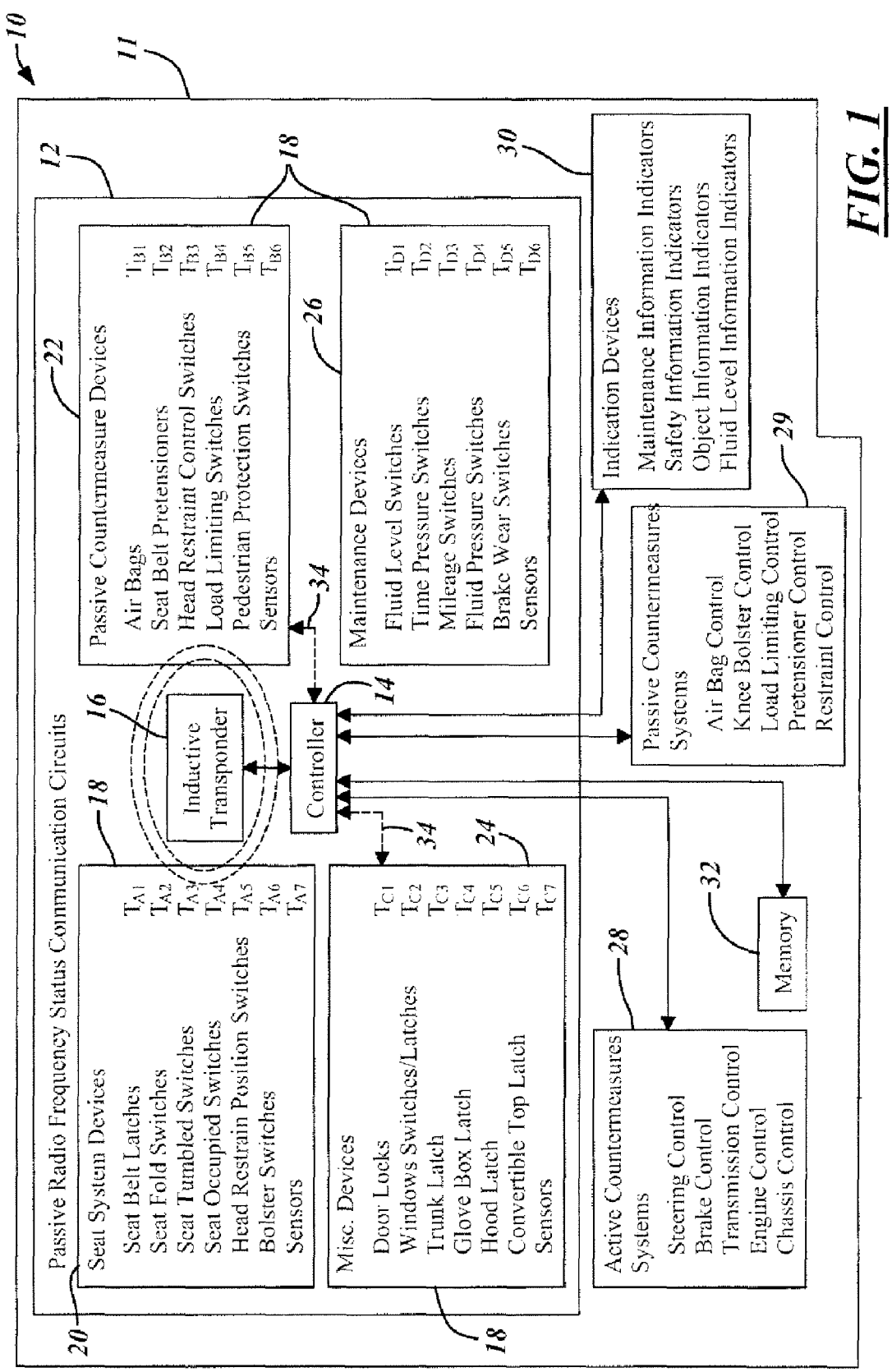
FIG. 1 is a block diagrammatic view of an in-vehicle element radio frequency identification and indication system in accordance with an embodiment of the present invention.

In each of the following figures, the same reference numerals are used to refer to the same components. A variety of other embodiments are contemplated having different combinations of the below described features of the present invention, having features other than those described herein, or even lacking one or more of those features. As such, it is understood that the invention can be carried out in various other suitable modes. The present invention may apply to automotive, aeronautical, nautical, railway, commercial, and residential industries, as well as to other industries that utilize similar molding processes.

In the following description, various operating parameters and components are described for one constructed embodiment. These specific parameters and components are included as examples and are not meant to be limiting.

Referring now to FIG. 1, an in-vehicle element radio frequency identification and indication system (hereinafter "the RFID system") 10 for a vehicle 11 and in accordance with an embodiment of the present invention is shown. The RFID system 10 includes multiple passive RF status communication circuits 12, which each includes one or more controllers 14 and one or more inductive transponders 16 (only one controller and inductive transponder are shown). The RF circuits 12 also each include one or more RF identification tags $T_{A1}$-$T_{D6}$, which are associated with one or more in-vehicle RF tagged elements 18, such as the seat system devices 20, the countermeasure devices 22, the miscellaneous devices 24, the maintenance devices 26, and other devices within the vehicle 11 that an RF tag may be applied thereto. An "in-vehicle RF tagged element" may refer to any system, component, or device within or on a vehicle by which an RF tag may be attached, coupled, or provide information pertaining thereto. The inductive transponder 16 is in wireless communication with the RF tags $T_{A1}$-$T_{D6}$. The controller 14 is also coupled to the active countermeasure systems 28, passive countermeasure systems 29, the indication devices 30, and to the memory 32. The controller 14 may further be in wired/wireless communication with some of the stated devices for control thereof, as represented by dashed lines 34. The controller 14 may perform various tasks associated with the active countermeasure systems 28, the passive countermeasure systems 29, and the indication devices 30 in response to the signals received from the in-vehicle RF elements 18.

In one embodiment, the inductive transponder 16 is used to scan the RF tags $T_{A1}$-$T_{D6}$, as well as other RF tagged elements. An RF tagged element may have an associated ON/OFF, Engaged/Disengaged, Active/inactive states or the like. In another embodiment, the RF tagged elements 18 are scanned to acquire identification and other related information pertaining to each of the elements 18.

The controller 14 may be microprocessor based such as a computer having a central processing unit, memory (RAM and/or ROM), and associated input and output buses. The controller 14 may be an application-specific integrated circuit or may be formed of other logic devices known in the art. The controller 14 may be a portion of a central main control unit, an interactive vehicle dynamics module, a restraints control module, a main safety controller, a control circuit having a power supply, or may be a stand-alone controller as shown.

Figure 4:
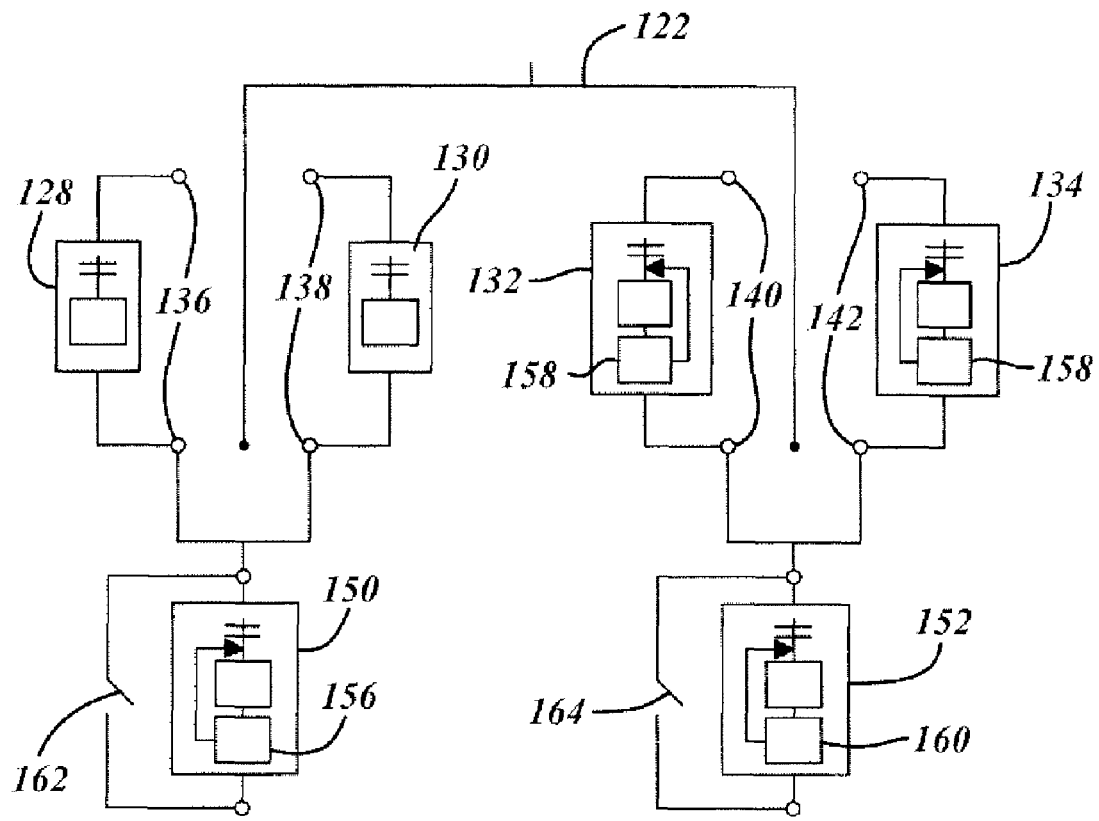
FIG. 4 is a schematic representative example view of double-pole-double-throw radio frequency identification circuit in accordance with an embodiment of the present invention.

The inductive transponder 16 generates status request signals in the form of electromagnetic waves. The RF tags $T_{A1}$-$T_{D6}$ receive the electromagnetic waves, which they draw power therefrom and in response thereto inductively generate current status signals. The RF tags $T_{A1}$-$T_{D6}$, as shown and as primarily described below, are passive and thus do not have an associated power supply or battery rather they respond using energy received from the inductive transponder 16. However, in one embodiment of the present invention, the RF tags $T_{A1}$-$T_{D6}$ are semi-passive and utilize power from a power source (not shown) for chip or circuit operation and utilize power drawn from the electromagnetic waves to respond to the inductive transponder 16. The RF tags $T_{A1}$-$T_{D6}$ may be read only or read/write. Each RF tag $T_{A1}$-$T_{D6}$ includes an integrated circuit chip and one or more antenna, which together perform as a transponder. Example RF tags are shown in FIGS. 2-4.

The seat system devices 20 include seat belt latches $T_{A1}$, seat fold latches $T_{A2}$, seat tumbled latches $T_{A3}$, seat occupied switches $T_{A4}$, head restraint position switches $T_{A5}$, bolster switches $T_{A6}$, sensors $T_{A7}$, and other related seat system devices and the like for which an RFID circuit may be attached. The passive countermeasure devices 22 include air bags $T_{B1}$, seat belt pretensioners $T_{B2}$, head restraint control switches $T_{B3}$, load limiting switches $T_{B4}$, pedestrian protection switches $T_{B5}$, sensors $T_{B6}$ and other countermeasure devices and the like for which an RFID circuit may be attached.

The miscellaneous devices 24 include door locks $T_{C1}$, window switches/latches $T_{C2}$, a trunk latch $T_{C3}$, a glove box latch $T_{C4}$, hood latch $T_{C5}$, convertible top latches $T_{C6}$, sensors $T_{C7}$, and other devices and the like for which an RFID circuit may be attached. The maintenance devices 26 include fluid level switches $T_{D1}$, tire pressure switches $T_{D2}$, mileage switches $T_{D3}$, fluid pressure switches $T_{D4}$, brake wear switches $T_{D5}$, sensors $T_{D6}$, and other maintenance devices and the like for which an RFID circuit may be attached.

The active countermeasures systems 28 may include brake control, throttle control, steering control, suspension control, transmission control, and other chassis control systems. The controller 14 in response to the current status signals received from the RF tags $T_{A1}$-$T_{D6}$ may perform one or more tasks associated with the active countermeasure systems 28, as needed, to prevent a collision or an injury. The controller 14 may autonomously operate the vehicle 12 using the active countermeasure systems.

The passive countermeasure systems 29 may include internal air bag control, seatbelt control, knee bolster control, head restraint control, load limiting pedal control, load limiting steering control, pretensioner control, external air bag control, and pedestrian protection control. Pretensioner control may include control over pyrotechnics and seat belt pretensioners. Air bag control may include control over front, side, curtain, hood, dash, or other type air bags. Pedestrian protection control may include controlling a deployable vehicle hood, a bumper system, or other pedestrian protective devices.

The indication devices 30 include maintenance information indicators, safety information indicators, object information indicators, fluid level information indicators, and other indicators that may be used by a vehicle occupant or by the controller 14. The indication devices 30 may be used when generating various status signals, identification signals, error signals, warning signals, or other signals known in the art. The indication devices 30 may include a video system, an audio system, one or more LEDs or lights, a global positioning system, a heads-up display, headlights, taillights, a display system, a telemetric system or other indicators. The indication devices 30 may be used to supply external-warning signals to objects or pedestrians located outside of the vehicle 11, or other pre and post collision information.

Referring now to FIG. 2, a side block diagrammatic view of a RF identification system 50 as applied to a seat system 52 and in accordance with an embodiment of the present invention is shown. The RF system 50 includes an inductive transponder 54 and a controller 56, which are similar to the transponder 16 and to the controller 14. The inductive transponder 54 is used to scan one or more RF tags located within the seat system 52. In the embodiment shown, a RF tag 58 is incorporated within a seat belt buckle 60 and is used to indicate when the seat belt tongue 61 is latched into the buckle 60. The seat belt tongue 61 and the buckle 60 perform as a switch. Of course, the RF tag 58 may be incorporated in or on the tongue 61 as opposed to the buckle 60. The RF tag 58 includes a main circuit 62, a delay device or circuit 64, and an antenna 66. The circuits 62 and 64 and the antenna 66 may be incorporated on a single integrated circuit chip or may be separate components, as shown.

When the tongue 61 is latched into the buckle 60, the RF tag 58 is activated or deactivated. The RF tag 58 may be in an active state when the buckle 60 is latched or unlatched. When activated the RF tag 58 transmits identification information and latch status information to indicate to the controller 56 that the seat belt 68 is buckled or unbuckled.

Each seat system of a vehicle may incorporate any number of RF tags and the controller 56 may scan any number of seat systems having the stated tags. A couple other example RF tags 70 and 72, which are attached to a seat back latch 74 and a head restraint post 76, respectively, are shown. The RF tags 70 and 72 may be used to indicate when the seat back 77 is folded or when the head restraint 78 is extended.

To increase safety and to improve controller and occupant awareness of the actual state of each seat system within a vehicle, the embodiments with respect to FIGS. 3 and 4 are below provided. The embodiments although primarily described with respect to a seat system, may be applied to other systems, devices, or components within a vehicle some of which are stated above.

Referring now also to FIG. 3, a schematic representative example view of single-pole-single-throw radio frequency identification circuit 80 in accordance with an embodiment of the present invention is shown. The RF circuit 80 includes a seat belt latch 82, which is in the form of a single-pole-single-throw switch. The seat belt latch 82 shorts either a first RF tag 84 or a second RF tag 86 depending upon the state thereof. The first RF tag 84 is coupled between a first set of terminals 88 and the second RF tag 86 is coupled between a second set of terminals 90. The first RF tag 84 includes a first RF chip 92 and a first antenna 94 and may include a first delay circuit 96. The second RF tag 86 includes a second RF chip 98 and a second antenna 100 and may include a second delay circuit 102.

The seat belt latch 82 includes a center branch 103, which may be toggled between the first set of terminals 88 and the second set of terminals 90. As an example, using the embodiment of FIG. 2, the tongue 61 may perform as the center branch 103 and the buckle 60 may have the terminals 88 and 90. When the tongue 61 is not latched to the buckle 60, the seat belt latch 82 is in an open state and the center branch 103 is coupled across the second terminals 90 to short the second RF tag 86. When the tongue 61 is latched into the buckle 60, the switch 82 is in a closed state and the center branch 103 is coupled across the first terminals 88 to short the first RF tag 84. The term "short" does not necessarily refer to the coupling of a device to a ground potential, but rather refers to the deactivation of a device or the prevention of that device from responding. For example, the receiving antenna 94 may be shorted to ground or disabled using some other technique known in the art when the tongue 61 is latched into the buckle 60.

The use of two RF tags provides, in effect, a backup and improves knowledge of the given switch. The controller 56 in scanning for status information pertaining to the buckle 60 may scan both the first RF tag 84 and the second RF tag 86. When the first RF tag 84 does not respond and the second RF tag 86 does respond, there is an increased confidence level that the tongue 61 is latched into the buckle 60. Likewise, when the first RF tag 84 responds and the second RF tag 86 does not respond the controller 56 can continue with the assured understanding that the tongue 61 is not latched in the buckle 60. On the other hand, when both RF tags 84 and 86 respond, do not respond, or respond in an inappropriate order, the controller 56 has knowledge that one or more devices or components are operating inappropriately. This improves vehicle and occupant safety. The controller 56 in having the associated backup is provided with additional information to better determine whether to perform or to not perform a countermeasure, to inform a vehicle occupant of status information, and/or to indicate an error signal.

Each RF tag, including the RF tags 84 and 86, may have an associated delay circuit. The delay circuits, such as the circuits 96 and 102, may be coupled to, circuit components of, or integrally formed as part of the chips of the RF tags 84 and 86. Additional RF tags may be incorporated into the RF circuit 80. As an example, a third RF tag 104 is shown and is coupled in series with both the first RF tag 84 and the second RF tag 86. The third RF tag 104 includes a third RF chip 106, a third antenna 108, and a third delay circuit 110. The third RF tag 104 may be coupled to a seat present latch 112. The seat present latch 112 is coupled in parallel to the third RF tag 104. When the seat present latch 112 is in an open state, the third RF tag 104 indicates that the corresponding seat is present, locked in position, or locked in the appropriate position within a vehicle. This may best pertain to second and third row seats of a vehicle that often can be removed, but may also pertain to other seats of a vehicle.

The delay circuits 96, 102, and 110 are preset such that they provide information in a sequential manner. Delays in signal transmission is represented by the feedback loops 111, which may extend from the delay circuits 96, 102, and 110 to the antennas 94, 100, and 108, as shown. Signal transmission may be performed using the same antennas as that used for reception or other separate antennas may be used. In the embodiment shown, when the first RF tag 84 is shorted, the second RF tag 86 provides identification information and latch status information. The identification information may include RF tag identification numbers and seat belt identification numbers for identifying the seat belt and the location of that seat belt within the vehicle. Of course, other pertinent information may also be provided. The information from the second RF tag 86 may be delayed by a predetermined amount of time or may be simply transmitted without delay. After a predetermined period of time the third RF tag 104 transmits information pertaining to the presence of the associated seat system. A controller, such as the controller 56, that has previous knowledge of the timing of the delay circuits 102 and 110, receives the current status signals of the second RF tag 86 and the third RF tag 104 in sequential order. Thus, the current status signals may be transmitted over the same frequency without interference therebetween. The delay circuits 96, 102, and 110 may be coupled to delay the reception of power by a RF tag, the reception of a status request signal by a RF tag, the transmittance of a current status signal from a RF tag, or via some other technique.

In another embodiment of the present invention, the delay circuits 96, 102, and 110 are not utilized. Rather, each of the RF tags 84, 86, and 104 has an associated frequency and bandwidth. In this embodiment, the current status signals are modulated and transmitted simultaneously. The associated controller, such as the controller 56, may channel hop or demodulate the received current status signals to obtain information pertaining to each of the RF tags 96, 102, and 110.

In yet another embodiment, one or more electrical switches (not shown) may be used in addition to or in replacement of the mechanical switches shown above, such as the seat belt latch 82 and the seat present latch 112. The electrical switches may be in the form of electrical wipers, solid-state devices, or in some other form known in the art. When electrical switches are used one or more energy harvesting mats 113 (only one is shown) may be used to power the electrical switches. The energy harvesting mats may be used to convert solar energy, thermal energy, motion or kinetic energy, or some other energy into electrical energy to in effect open or close the associated electrical switches.

The use of electrical switches allows one to easily configure an output to short an RFID tag when a particular set of switches are closed, a particular process is performed, or set of conclusions exists. For example, when a particular set of latches are closed then one or more RFID tags may be inactivated as a result. Thus, multiple switches may be associated with a single RFID tag, as opposed to a single latch corresponding to a single RFID tag.

Referring now to FIG. 2 and to FIG. 4, in which a schematic representative example view of double-pole-double-throw radio frequency identification circuit 120 in accordance with an embodiment of the present invention is shown. The RF circuit 120 includes a double-pole-double-throw switch 122 that has a first branch 124 and a second branch 126. The first branch 124 toggles between a first RF tag 128 and a second RF tag 130. The second branch 126 toggles between a forth RF tag 132 and a fifth RF tag 134. Since the branches 124 and 126 are coupled together, the toggling thereof is performed simultaneously. In order to toggle the branches 124 and 126 to provide contact with terminals 136, 138, 140, and 142, one or more latches or switches (only one of which is shown, switch 122) may be engaged. The latches or switches correspond to seat system status parameters or other parameters depending upon the application. The branches 124 and 126 may be toggled, for example, when the tongue 61 is latched within the buckle 60 and/or when there is an occupant in the seat system 52, thereby requiring two seat system parameters to be satisfied. Any combination of seat system status parameters may be satisfied prior to toggling or changing the state of the branches 124 and 126.

A third RF tag 150 is coupled to the first RF tag 128 and the second RF tag 130. A sixth RF tag 152 is coupled to the forth RF tag 132 and the fifth RF tag 134. Notice that the RF circuit 120 has two backup stages, one associated with the first RF tag 128 and the second RF tag 130 and another associated with the forth RF tag 132 and the fifth RF tag 134.

In the embodiment of FIG. 4, the first RF tag 128 and the second RF tag 130 do not have a delay circuit. The third RF tag 150 has a first delay circuit 156 with a first delay period. The forth RF tag 132 and the fifth RF tag 134 have a second delay circuit(s) 158 with a second delay that is longer than the first delay. The sixth RF tag 152 has a third delay circuit 160 with a third delay that is longer than the second delay. The first RF tag 128 and the second RF tag 130 may be used to indicate seat belt latch status. The third RF tag 150 may be used to indicate seat system presence, as represented by seat present switch 162, which is parallel operation with the third RF tag 150. The forth RF tag 132 and the fifth RF tag 134 may be used to indicate whether the seat system is occupied. The sixth RF tag 152 may be used to indicate whether the seat system is folded or tumbled, as represented by folded switch 164, which is in parallel operation with the sixth RF tag 152. The stated embodiment is capable of determining which seat belts are latched, which seat systems are present and properly located, which seat systems are folded, tumbled, or stowed. One skilled in the art would easily envision other arrangements and configurations all of which are not mentioned here for simplicity.

In yet another embodiment of the present invention, a combination of sequential and simultaneous transmission and reception of current status signals is performed. For example, the information transmitted from the third RF tag 150 may be delayed from information transmitted from the first RF tag 128 and the second RF tag 130, but may be simultaneously transmitted with information transmitted from the sixth RF tag 152.

Any number of RF tags may be utilized and incorporated to provide information related to the seat system and other in-vehicle elements. The RF tags may be in series, parallel, or a combination thereof. Also, the RF tags may be in series or parallel operation with their corresponding in-vehicle RF tagged elements. In addition, any number of RF tags may be used as backups.

Figure 5:
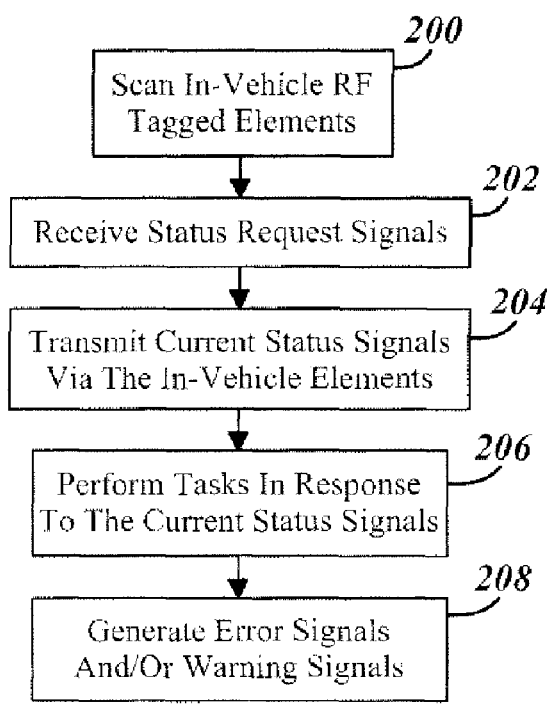
FIG. 5 is a logic flow diagram illustrating a method of tracking, identifying, and determining the presence and status of at least one vehicle element in accordance with an embodiment of the present invention.

Referring now to FIG. 5, a logic flow diagram illustrating a method of tracking, identifying, and determining the presence and status of at least one vehicle element in accordance with an embodiment of the present invention is shown.

In step 200, a controller scans one or more RF tags associated with one or more in-vehicle elements, via an inductive transponder, to acquire status, identification, and other related information. Example controllers, inductive transponders, and RF tags are described above. The controller uses the inductive transponder to generate status request signals. In step 202, the RF tags receive the status request signals.

In step 204, the RF tags inductively generate and transmit current status signals in response to the status request signals. The current status signals may be transmitted sequentially, simultaneously, or via some combination thereof. When transmitted sequentially, one or more of the current status signals may be delayed to prevent interference and overlap of transmission.

In step 206, the controller performs an in-vehicle task in response to the current status signals. The controller may, for example, perform tasks associated with the active countermeasure systems 28, the passive countermeasure systems 29, and may indicate to a vehicle operator status information, as described with respect to FIG. 1 above.

In step 208, the controller may also generate one or more error signals or warning signals when it is detected that one or more system devices or components are operating inappropriately or are in an inappropriate state for activation. When a signal was not received and should have been received, inappropriately received, or was received in a corrupted manner an error signal may be generated. The error signals and warning signals may be indicated to a vehicle occupant or used by the controller in performing or in not performing the tasks of step 106.

The above-described steps are meant to be illustrative examples; the steps may be performed sequentially, synchronously, simultaneously, or in a different order depending upon the application.

The present invention provides a status indication system that utilizes radio frequency identification technology to indicate the status of various in-vehicle elements. The present invention provides a system that is capable of passively and wirelessly determining the status of seat belts, seat systems, and associated devices, thereby, reducing the wires and system complexity that would be associated in performing the same.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An indication system for a vehicle, said indication system comprising:

at least one in-vehicle element including at least one seat system having an associated seat belt tongue and seat belt buckle;

a first radio-frequency circuit including (i) a transponder operable to transmit a status request signal and (ii) a first radio-frequency identification tag coupled to said at least one in-vehicle element and operable to inductively generate a first status signal associated with said at least one in-vehicle element in response to said status request signal; and a second radio-frequency circuit including a second radio-frequency identification tag coupled to said at least one in-vehicle element and operable to inductively generate a second status signal;

wherein when said seat belt tongue is latched within said seat belt buckle, said first radio-frequency circuit is inactive and said second radio-frequency identification tag is active.

2. A system for generating an indication of an operational status of an in-vehicle element comprising:

an in-vehicle element;

a first radio-frequency tag that is associated with the in-vehicle element and that is operable to generate a first identification-and-status information signal for the in-vehicle element in response to a status request signal, wherein the first identification-and-status information signal includes an identification and a first operational status of the in-vehicle element;

a second radio-frequency tag that is associated with the in-vehicle element and that is operable to generate a second identification-and-status information signal for the in-vehicle element in response to the status request signal, wherein the second identification-and-status information signal includes an identification and a second operational status of the in-vehicle element;

wherein when the in-vehicle element is in a predetermined operating status, the first radio-frequency tag is inactive and the second radio-frequency identification tag is active;

a controller that is responsive to the first and second identification-and-status information signals for generating a signal that is representative of the identification and the operational status of the in-vehicle element; and an indication device that is responsive to the signal from the controller for generating an indication of the operational status of the in-vehicle element.

3. The system defined in claim 2 wherein the in-vehicle element is one of a door, a window, a seat, a hood, a trunk lid, a countermeasure device, a fluid level switch, a load limit switch, a pressure switch, and an illumination device.

4. The system defined in claim 2 wherein the in-vehicle element is a seat belt system having a seat belt tongue and a seat belt buckle associated therewith.

5. The system defined in claim 4 wherein the indication device indicates whether the seat belt tongue is latched within the seat belt buckle.

6. The system defined in claim 2 further including a delay circuit that is operable to prevent the first and second identification-and-status information signals from being generated simultaneously.

\* \* \* \* \*